United States Patent [19]

Quinn

[11] 3,882,532

[45] May 6, 1975

[54] EXTERNALLY ACCESSING MECHANICALLY DIFFICULT TO ACCESS CIRCUIT NODES IN INTEGRATED CIRCUITS

[75] Inventor: Hubert F. Quinn, Ossing, N.Y.

[73] Assignee: IBM Corporation, Armonk, N.Y.

[22] Filed: Dec. 26, 1973

[21] Appl. No.: 428,609

Related U.S. Application Data

[62] Division of Ser. No. 268,407, July 3, 1972, Pat. No. 3,801,910.

[52] U.S. Cl. ........................ 357/29; 357/32; 357/68; 357/17

[51] Int. Cl. ........................ H01l 11/00; H01l 15/00

[58] Field of Search ............... 317/234, 5.4, 235, 27

[56] References Cited

UNITED STATES PATENTS

| | | | |
|---|---|---|---|
| 3,488,636 | 1/1970 | Dyck | 317/235 N |
| 3,535,532 | 10/1970 | Merryman | 317/235 N |
| 3,551,761 | 12/1970 | Ruoff | 317/235 N |
| 3,746,973 | 7/1973 | McMahon | 317/234 H |

*Primary Examiner*—Andrew J. James
*Attorney, Agent, or Firm*—J. B. Kraft

[57] ABSTRACT

A structure for selectively externally accessing mechanically difficult to access circuit nodes in an integrated circuit by the combination of an externally accessible circuit terminal and a plurality of connecting means, each of which connect a particular circuit node which is difficult to access to said terminal. Each of the connecting means includes a photoconductive semiconductor device which is normally electrically nonconductive but which is adapted to electrically conduct when subjected to localized light such as a laser beam. When the particular photoconductive device is rendered conductive, it in turn makes the connecting means associated with it conductive and, thereby, provides a conductive path from the particular circuit node to the externally accessible terminal.

2 Claims, 4 Drawing Figures

EXTERNALLY ACCESSING MECHANICALLY DIFFICULT TO ACCESS CIRCUIT NODES IN INTEGRATED CIRCUITS

This is a division, of application Ser. No. 268,407 filed July 3, 1972, now U.S. Pat. No. 3,801,910.

RELATED PATENT INVESTIGATION

U.S. Pat. application Ser. No. 300,075, E. M. Hubacher, entitled "Contacting Integrated Circuit Chip Terminal Through Wafer Kerf," filed Oct. 24, 1972, and assigned to a common assignee, is related to the present application.

BACKGROUND OF THE INVENTION

The present invention relates to the testing of monolithic integrated circuits and, particularly, to structures for externally accessing integrated circuit nodes which are mechanically difficult to access.

Monolithic integrated circuits comprise a complete circuit on an integral unit or chip of semiconductor material. In general, the components or devices of the circuit are imbedded in and extend from a surface of the semiconductor substrate. A typical monolithic integrated circuit structure is described in U.S. Pat. No. 3,539,876.

The tests performed on monolithic integrated circuits may be broken into two general categories, functional testing for circuit characteristics and tests for device characteristics. In functional testing, the integrated circuits are tested in order to determine the capability of the integrated circuits to perform the basic function for which they were designed. The functional tests are designed relative to the intended application of the integrated circuit. Such tests include switching thresholds, saturation levels, the size of the load which the circuit is capable of driving, turn-on and turn-off times and noise immunity of the circuit.

At the present state of the art, such functional tests are usually performed directly on the integrated circuit chip by applying specific electrical input to specified pads or contact terminals on the chip and monitoring the electrical outputs in other pads or terminals in the chip. Because of the basic nature of functional testing, it is conventionally carried out after the completion of the device formation, dielectric isolation and metallization in chip fabrication. In addition, in large scale integrated circuits of relatively high device density, functional testing is most suitably carried out at the wafer level, i.e., before the wafer is diced into the individual integrated circuit chips.

The functional testing at the wafer level is conventionally carried out by contacting the chip terminals, usually arranged around the periphery of the chip, with an appropriate test head having an array of contacts or probes which respectively engage the chip terminals. The probes in the tester head respectively apply signals to some terminals and sense signals from other terminals. With the increasing complexity of large scale integration and the attendant densification of integrated circuits, the number of chip terminals has increased while the size of and the spacing between such chip terminals has decreased. As a result, means for making direct mechanical contact to chip terminals with tester heads are becoming increasingly difficult to implement.

Accordingly, there is a rising need in the testing art for structures and methods for connecting the chip terminals to the tester which avoids direct mechanical contact of the chip terminals by a tester probe head. This need may be expected to become even more significant as the density of devices in integrated circuits continues to increase in the direction of "computers on chips."

However, even with integrated circuits in which it is still mechanically possible to carry out functional testing by directly contacting the chip terminals, expedients whereby internal circuit nodes could be contacted for general testing or diagnostic testing purposes would be of considerable value.

The problem of providing expedients for nonmechanical contacting of integrated circuit terminals or other internal nodes is further complicated by the fact that the need to test the integrated circuits, in general, or for diagnostic purposes, will normally exist or arise after the protective insulative layer and metallization has been formed on the chip.

SUMMARY OF INVENTION

Accordingly, it is a primary object of the present invention to provide a testing system and integrated circuit structure which permits external access to the chip terminals for both signal application and signal sensing without making direct mechanical contact to such terminals.

Another object of the present invention is to provide a test system and integrated circuit structure which permits access to internal circuit nodes for both signal application and sensing without making direct mechanical contact to such nodes.

It is a further object of the present invention to provide an integrated circuit chip structure which permits access to nodes in the integrated circuit without making direct mechanical contact to such nodes.

It is yet another object of the present invention to provide a structure and method for externally accessing integrated circuit nodes without direct mechanical contact after a protective insulative layer has been formed over the integrated circuit surface.

It is an even further object of the present invention to provide an integrated circuit structure with means for selectively externally accessing mechanically difficult to access circuit nodes, which means may be disenabled during the operation of the integrated circuit.

In accordance with the present invention, a monolithic integrated circuit structure is provided with means for selectively externally accessing mechanically difficult to access circuit nodes. These means comprise at least one externally accessible circuit terminal, and a plurality of connecting means, each of which respectively connect one of the circuit nodes to the terminal. Each of the connecting means respectively includes a photoconductive semiconductor device which is normally non-conductive but which is adapted to electrically conduct when subjected to light, particularly to collimated light such as a laser beam, to render the connecting means conductive.

In accordance with one aspect of the present invention, the photoconductive devices are located in the wafer kerf and connected with the externally accessible circuit terminals in said kerf. In such a structure, photoconductive device accessing circuitry is available for testing at the wafer level, and is eliminated from the integrated circuits when the kerf is severed from the chip during wafer dicing.

In accordance with an additional aspect of the present invention, the structure further includes circuits for selectively applying selected current levels to mechanically difficult to access internal circuit nodes during testing. Such circuits comprise a photoconductive device connected to an internal circuit node. The photoconductive device is normally non-conductive. However, when subjected to localized light such as a laser beam, the photoconductive device produces a current which is applied to the internal circuit node.

The foregoing and other objects, features and advantages of the invention will be apparent from the following more particular description and preferred embodiments of the invention as illustrated in the accompanying drawings.

DESCRIPTION OF PREFERRED EMBODIMENTS

Figure 1:
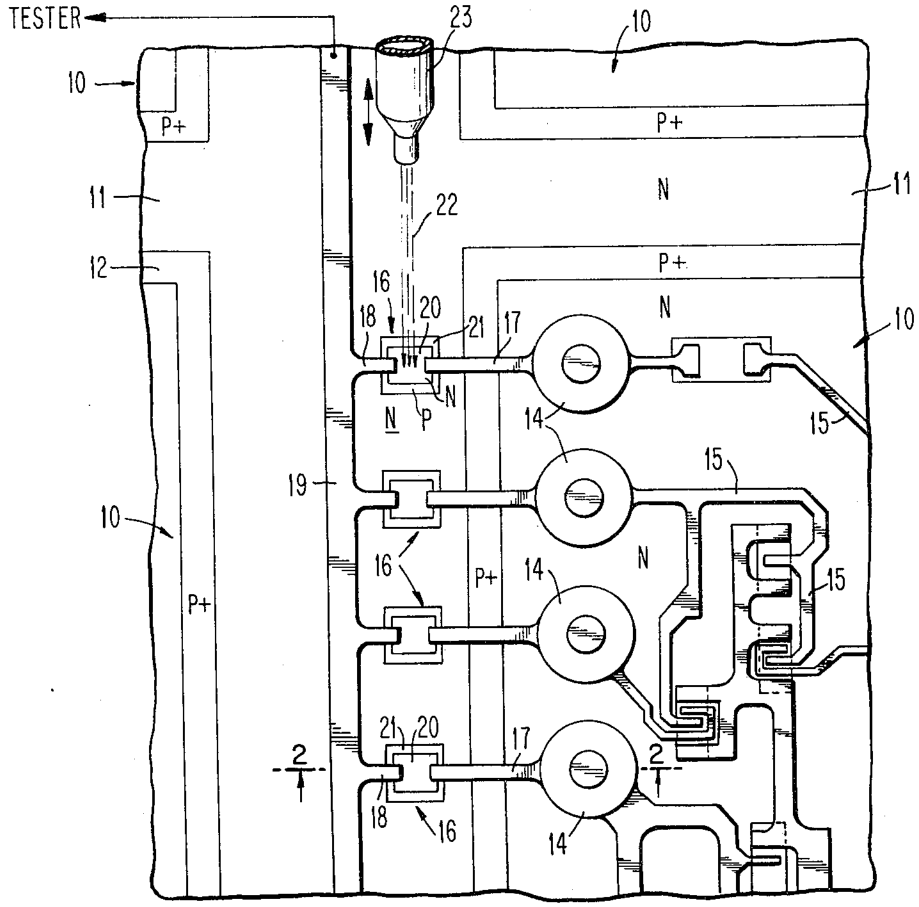
FIG. 1 is a top view of a fragment of the surface of an integrated circuit wafer structure including both chip and kerf regions between chips.
Figure 2:
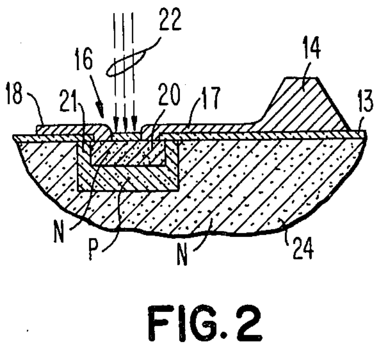
FIG. 2 is a diagrammatic, cross-sectional view taken along line 2—2 of FIG. 1.

With reference to FIGS. 1 and 2, there will now be described a preferred embodiment of the present invention. The wafer fragment contains a plurality of chips 10 and a kerf 11 separating the chips. For purposes of clarity, the complete details of the chip have not been shown. For the present illustration, the integrated circuits may be considered to have a structure corresponding to the structure of the integrated circuits described in U.S. Pat. No. 3,539,876, and the integrated circuit devices and metallization may be advantageously fabricated either by utilizing the processes described in said patent or by present known ion implantation techniques. The chip substrate as well as the kerf is made of N type material usually in epitaxial form. Isolation in the chip is provided by a diffused peripheral P+ isolation region 12 and by a layer of insulative material 13, e.g., silicon dioxide, covering the chip surface. The terminals of the chip 14 are formed on the surface of the insulative layer 13 and are connected to the various active and passive devices in the circuit by a metallization pattern 15.

The circuitry for externally accessing pads 14 is formed primarily in the kerf of the wafer. The circuitry comprises photoconductive devices 16, metallic connectors 17 connecting photoconductive devices 16 to terminals 14, and metallic connectors 18 connecting the photoconductive devices 16 to bus bar 19 which may be readily externally accessed by suitable terminal means and connected to the tester. The means for connecting bus bar 19 to the tester, which are not shown, may be any suitable means for forming mechanical electrical contact, e.g., a test probe.

The photoconductive devices 16 may be any type of photoconductive device which is capable of being formed in a semiconductor substrate and, thus, is integratable with an integrated semiconductor circuit. In the structure shown in FIGS. 1 and 2, photoconductive devices have the photoconductive portion 20 and the isolation portion 21. P type region 21 serves to isolate N type photoconductive semiconductor portion 20 from the other photoconductive devices 16. One end of photoconductive region 20 is connected to chip terminal 14 by metallic connector 17, while the other end of region 20 is connected to bus bar 19 by metallic connector 18. Region 20 is normally non-conductive, e.g., has a sheet resistance as high as in the order of 10,000 ohms per square. Conventional ion implantation techniques appear to be more preferable when very high resistances are desired. However, upon the selective application of collimated light 22, such as a laser beam emanating from laser source 23, the sheet resistivity of region 20 is reduced by an order of 10 to about 1,000 ohms per square, thereby rendering region 20 relatively conductive and forming a conductive path from pad 14 through the photoconductive device to bus bar 19 to which the tester may be connected in any convenient manner. While the photoconductive device 16 may be made by known double-diffusion techniques using photolithographic masking, where high resistivities in the order of 10,000 ohms per square are needed for region 20, it is most preferable that region 20 be formed by ion implantation. With reference to FIG. 2, P region 21 which is the isolating region has a resistivity in the order of 0.05 to 0.10 ohm-cm. and an impurity concentration in the order of from 1 to $3 \times 10^{17} cm^{-3}$. This region may be made by a conventional boron diffusion technique.

With a relatively high resistivity, semiconductor region such as 20, a source of localized light such as collimated light 22 directed at region 20 will cause region 20 to change from a high resistivity to a relatively low resistivity state. Since the lateral dimensions of photoconductive region 20 are conveniently in the order of from 0.1 to 0.2 mils, source 23 must be capable of providing localized light which has resolution within such dimensions. A laser beam preferably provides such light. The source of the laser beam may conveniently be any commercially available helium-neon gas laser operating at a wavelength of 1.1 microns. The intensity of the laser beam is preferably in the order of 100 milliwatts/$cm^2$.

Laser source 23 may be mounted with respect to wafer 10 so that the movement between them is translational. For example, source 23 may be stationary and the wafer movable or vice versa. Accordingly, when a give one of terminals 14 is to be connected to the tester, the laser is moved so as to be applied to the photoconductive device 16 associated with the given terminal 14. Therefore, when a given device 16 is so subjected to laser beam 22, the associated chip terminal 14 is connected into the tester.

The circuit in FIG. 1 may be used both for tester sensing of the voltage level at a particular terminal 14, as well as for the application of a particular voltage level to terminal 14 via bus bar 19 for testing purposes.

Figure 4:
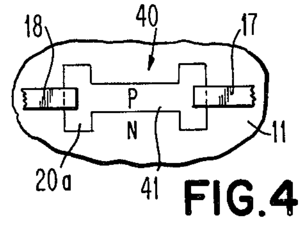
FIG. 4 is a fragmentary diagrammatic top view of a self-isolating photoconductive device which may be directly substituted for photoconductive device 16 in FIG. 1.

Photoconductive devices 40 shown in FIG. 4 may be directly substituted for each of the photoconductive devices 16 shown in FIG. 1. The devices in FIG. 4 are self-isolating, i.e., the voltage levels of terminal 14 and bus bar 19 must be such that junction 41 between the P type photoconductive region 20*a* and the N type epitaxial region 11 is reverse biased and, thus, does not become conductive even in the activated stage when region 20a is conducting. In order to render junction 41 reverse biased, a negative potential must be applied through either terminals 17 or 18.

Upon the completion of testing, the wafer is then diced into chips, and kerf region 11 is removed, thereby eliminating all devices 16 from the integrated circuitry.

While the described embodiment has shown only the utilization of a single laser beam and a single bus bar providing the external connection to the tester, it should be clear that a plurality of laser beams may be used in combination together with more than one external bus bar 19 to provide for the testing of a plurality of terminals 14 in parallel.

Figure 3:
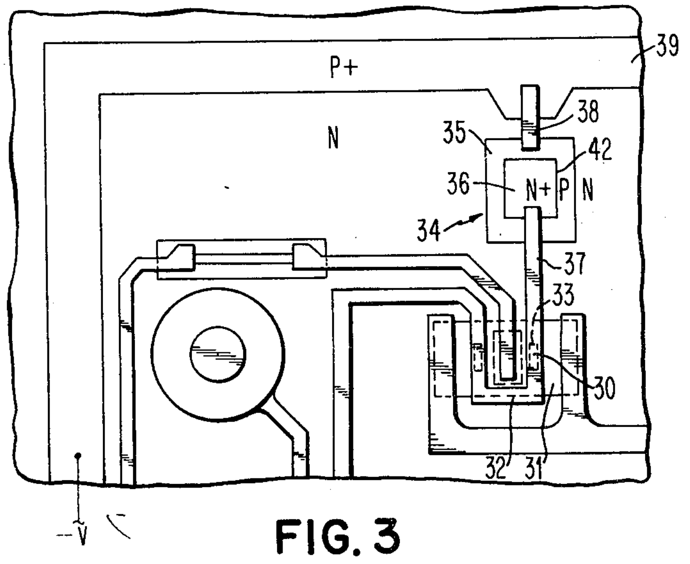
FIG. 3 is a diagrammatic top view of a fragment of an integrated circuit chip illustrating the aspect of the present invention wherein internal integrated circuit nodes are externally accessed.

While the previously described embodiments have been directed to a testing system wherein the accessing circuitry of the present invention is located in the kerf and serves to connect the chip terminals 14 to the tester, the structure of the present invention is also utilizable in externally accessing internal nodes within the integrated circuit which are difficult to access by mechanical means. For example, with reference to FIG. 3, there is shown an integrated circuit wherein an internal circuit node 30, which is a base contact made to P type base region 31 by metallization 32 through contact hole 33, is connected photoconductive device 34, a photoconductive diode which generates a current when subjected to localized light. Assuming that in order to test for a given condition prior to or even after chip operation, a current signal input is to be externally applied to base 31, device 34 can serve such a purpose. It comprises region 36 which is normally nonconductive but when subjected to localized light, e.g., laser beam, generates a current. Region 35 surrounds and isolates region 36, and forms a junction 42 with said region. Photoconductive diode 34 may be made by conventional double-diffusion techniques. In fact, if it is fabricated in an integrated circuit made in accordance with the previously mentioned techniques of U.S. Pat. No. 3,539,876, region 36 may be formed simultaneously with and have the same doping level as the emitter regions in said integrated circuits and region 35 may be fabricated simultaneously with and have the same doping level as the base region of said integrated circuit. For example, region 35 preferably has a resistivity in the order of from 0.05 to 0.10 ohm-cm. and a $C_0$ of about $3 \times 10^{17}cm^{-3}$, while region 16 may preferably have a $C_0$ of about $10^{20}cm^{-3}$. Junction 42 should be reverse biased during both the inactive and operative stages of photoconductive diode 34. This may be conveniently achieved by connecting P region 35 through metallic interconnector 38 to the chip isolation region 39. Since chip isolation region 39 is normally maintained at a negative potential, —V, P type diode region 35 will also be at this negative potential, thereby reverse biasing junction 42. Photoconductive region 36 is normally inactive. When a current is to be applied to region 36, a laser beam is applied to region 36 as previously described. When the laser beam is so applied, region 36 begins to generate semiconductor carriers, thereby creating a current which is applied to base region 31 through metallization 37 and contact holes 33.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a semiconductor integrated circuit structure comprising a semiconductor substrate surface from which a plurality of regions of different conductivity types extend into the substrate to provide the active and passive devices of the circuit, a layer of insulative material covering said surface, a plurality of electrical contacts extending through openings in said insulative layer respectively to said regions, and a metallization pattern formed on said insulative layer respectively connecting a plurality of chip terminals formed on said insulative layer to different regions through said contacts, the improvement comprising the combination of at least one externally accessible circuit terminal, a plurality of photoconductive semiconductor devices formed at said surface of said substrate, a plurality of first conductive connecting means on said insulative layer, each respectively extending through said insulative layer to contact one of said photoconductive devices and connecting said photoconductive device to said externally accessible terminal, and a plurality of second conductive connecting means on said insulative layer, each respectively extending through said layer to respectively contact one of said photoconductive devices and connecting said photoconductive device to a respective one of said chip terminals, said photoconductive devices being normally nonconductive but adapted to conduct when selectively exposed to light to thereby provide a conductive path from the chip terminal to which the exposed device is connected, through the exposed device to the externally accessible circuit terminal.

2. The monolithic integrated circuit of claim 1 wherein the chip terminals are on a plurality of chips on a wafer and the photoconductive devices are located in the wafer kerf.

* * * * *